UNITED STATES PATENT OFFICE.

NINA LARREY DURYEA, OF NICE, FRANCE.

FABRIC.

No. 909,379.  Specification of Letters Patent.  Patented Jan. 12, 1909.

Application filed December 4, 1907. Serial No. 405,121.

*To all whom it may concern:*

Be it known that I, NINA LARREY DURYEA, gentlewoman, citizen of the United States, residing at 55 Boulevard Victor Hugo, at Nice, Department Alpes Maritimes, Republic of France, have invented a certain new and useful Improvement in Fabrics; and I do hereby declare that the following is a full, clear, and exact description of the same.

The herein described article of manufacture resembles certain products that are generally passed off as paper. These products are, as a rule, composed of some fibrous material which is subjected to pressure rolls, while hot, after having been coated with some suitable agglutinant or waterproofing substance. A sheet-like article or product is thus produced, of variable thickness, which more or less possesses the property of being waterproof and which is turned to account for a great variety of purposes in various arts. The said product possesses, it is true, the valuable property of being practically untearable, but it only possesses that property to a certain degree, because if untearable in one direction, it may be torn apart in another. In other words, it resists being torn in a transverse sense, that is to say in the direction transverse to that in which its constituent fibers lie, but it is capable of being torn in the same direction as the fibers and consequently it is open to objection for some of the purposes it is used for. Now the market value of such an article of manufacture would be considerably increased and its uses would be much more numerous, if the article could be made entirely untearable.

The object of the present invention is to accomplish this purpose.

I proceed as follows. I take two sheets, fleeces layers or films of any suitable fibrous material, whether of animal, vegetable or even mineral origin, although I prefer wadding, as this substance is most usually employed. I cut them to the required size and lay one on the top of the other, care being taken that the fibers of one extend or lie either transversely or obliquely to the direction of the fibers of the other and I bind or connect them together in any suitable manner, say by pressure between rolls or otherwise. If desired, I may interpose between the superposed sheets, any suitable tissue, fabric or film of any desirable substance, either as a filling or as a stiffener. I may use more than two sheets and employ any larger number, and in addition to this, I may employ sheets, films, layers or fleeces of any desired thickness.

The next operation consists in coating the fibrous material and in agglutinating one sheet to the other by any suitable means, as for instance by dipping into a bath of any adhesive substance, such as rubber, after which the article is passed, as usual, between rolls which, preferably, should be heated. The degree and pressure and temperature may vary according to the thickness, stiffness, strength or density of the article to be made. The article may, if required, be rendered waterproof by coating or dipping it, when once made, into any known suitable substance, capable of producing the desired result.

An article or product is thus obtained the characteristic of which resides in the fact that it is completely untearable, as compared with articles of a like nature, as hitherto made.

The article is therefore capable of being used for a much larger number of purposes than those heretofore manufactured, on account of its great strength. For instance, it may be used as a substitute for morocco leather in the manufacture of furniture and upholstery, as a substitute for coverings in carriage work, as well as in the manufacture of tents, awnings, oil cloth and other purposes, dyeing and decorating, being applied, if required according to the purpose.

I claim:

A fabric, suitable for use as a substitute for morocco leather, composed of a series of waddings cut to the required size, overlying each other with their fibers crossed and bound together, and having suitable tissues acting as a filler or stiffener between said waddings, said waddings being saturated with a rubber composition to hold the layers together, and provided with a coating of a suitable water-proof composition, substantially as described.

In witness whereof I have hereunto set my hand this twenty first day of November 1907, in presence of two subscribing witnesses.

NINA LARREY DURYEA.

Witnesses:
RICHARD HAHN,
ATTILIO PIATTI.